United States Patent

Liedtke

[11] 4,027,137
[45] May 31, 1977

[54] LASER DRILLING NOZZLE

[75] Inventor: Hans George Liedtke, Binghamton, N.Y.

[73] Assignee: International Business Machines Corporation, Armonk, N.Y.

[22] Filed: Sept. 17, 1975

[21] Appl. No.: 614,049

[52] U.S. Cl. ............................................ 219/121 L
[51] Int. Cl.² ............................................ B23K 9/00
[58] Field of Search ................. 219/121 L, 121 LX; 331/94.5 R

[56] References Cited

UNITED STATES PATENTS

| | | | |
|---|---|---|---|
| 3,392,259 | 7/1968 | Meier | 219/121 L X |
| 3,417,222 | 12/1968 | Cannon et al. | 219/121 L X |
| 3,571,554 | 3/1971 | Baujoin | 219/121 L |
| 3,622,743 | 11/1971 | Muncheryan | 219/121 L |
| 3,626,141 | 12/1971 | Daly | 219/121 L |
| 3,685,882 | 8/1972 | Van Der Jagt | 219/121 LM X |
| 3,696,230 | 10/1972 | Friedrich | 219/121 L |
| 3,866,398 | 2/1975 | Vernon, Jr. et al. | 219/121 L X |

*Primary Examiner*—J. V. Truhe
*Assistant Examiner*—Fred E. Bell
*Attorney, Agent, or Firm*—Richard E. Bee

[57] ABSTRACT

A laser beam is applied to a workpiece by means of a spring-loaded metal nozzle which engages the workpiece. An aperture in the workpiece end of the nozzle accurately defines the size of the hole formed in the workpiece by the laser beam. A chamber located within the lower end of the nozzle is continuously evacuated by a vacuum pump to remove the drilling debris. Adjustment of the degree of vacuum within the nozzle adjusts the bearing pressure of the nozzle on the workpiece.

6 Claims, 4 Drawing Figures

LASER DRILLING NOZZLE

BACKGROUND AND SUMMARY OF THE INVENTION

This invention relates to apparatus for drilling holes in workpieces by means of radiant energy such as coherent light energy from a laser. While not limited thereto, the invention is particularly useful in the electronics manufacturing industry for drilling holes in integrated circuit substrates, printed circuit cards and the like.

The novel laser drilling apparatus described herein provides various advantages over previously known forms of laser drilling apparatus. It enables holes of highly accurate size to be drilled at a plurality of different locations on a workpiece without having to resort to the use of a hole pattern mask. It provides increased protection and safety for plant personnel who operate the apparatus or work in the vicinity thereof. It provides a cleaner and more efficient method for removal of the drilling debris. It protects critical optical elements from contamination by vapors and debris produced by the interaction of the laser beam with the workpiece material. And it enables quick and easy removal of a highly accurate hole size determining element for purposes of cleaning or replacing same.

A highly accurate hole size is obtained by providing a nozzle structure for passing a laser beam to the workpiece by way of a hole size defining aperture at the end of the nozzle structure and by placing such aperture up against the workpiece. Holes are drilled at different locations by changing the workpiece location at which the nozzle engages the workpiece. No hole pattern mask is required and a variety of different hole patterns can be accommodated in a flexible and efficient manner.

Increased operator safety is obtained by providing a nozzle structure which is placed up against the workpiece. As a consequence, the interaction of the laser beam with the workpiece material is not visible to the eye of the operator. The operator is shielded from both intense radiant energy and particles of drilling debris.

A continuously evacuated chamber located within the lower end of the nozzle provides a highly efficient method for the removal of drilling debris. The drilling debris is immediately sucked up into the evacuated chamber and removed by way of the vacuum pumping system. Among other things, this prevents drilling debris from being scattered over the workpiece and interfering with the drilling of other holes in the workpiece. It also provides for the immediate removal of any noxious or contamination-causing vapors produced by the interaction of the laser beam with the workpiece material.

The evacuated chamber in the lower end of the nozzle is separated from the workpiece by a removable metal disk having the hole size defining aperture in the center thereof. The laser beam passes through the aperture and onto the workpiece. The aperture defines the size of the hole drilled in the workpiece and, hence, may be of very small diameter for the case of very small holes. Thus, the diameter of the aperture may be, for example, as small as 0.001 inches. Thus, the aperture may require fairly frequent cleaning or replacement. This is greatly facilitated by having the aperture located in a removable disk. During drilling operations, the disk is held in place by the vacuum in the evacuated chamber. Thus, releasing the vacuum releases the disk and enables quick and easy removal of same for purposes of cleaning the aperture or replacing the disk with a new disk having a clean aperture.

For a better understanding of the present invention, together with other and further advantages and features thereof, reference is made to the following description taken in connection with the accompanying drawings, the scope of tthe invention being pointed out in the appended claims.

BRIEF DESCRIPTION OF THE DRAWINGS

Referring to the drawings.

DESCRIPTION OF THE PREFERRED EMBODIMENT

Figure 1:
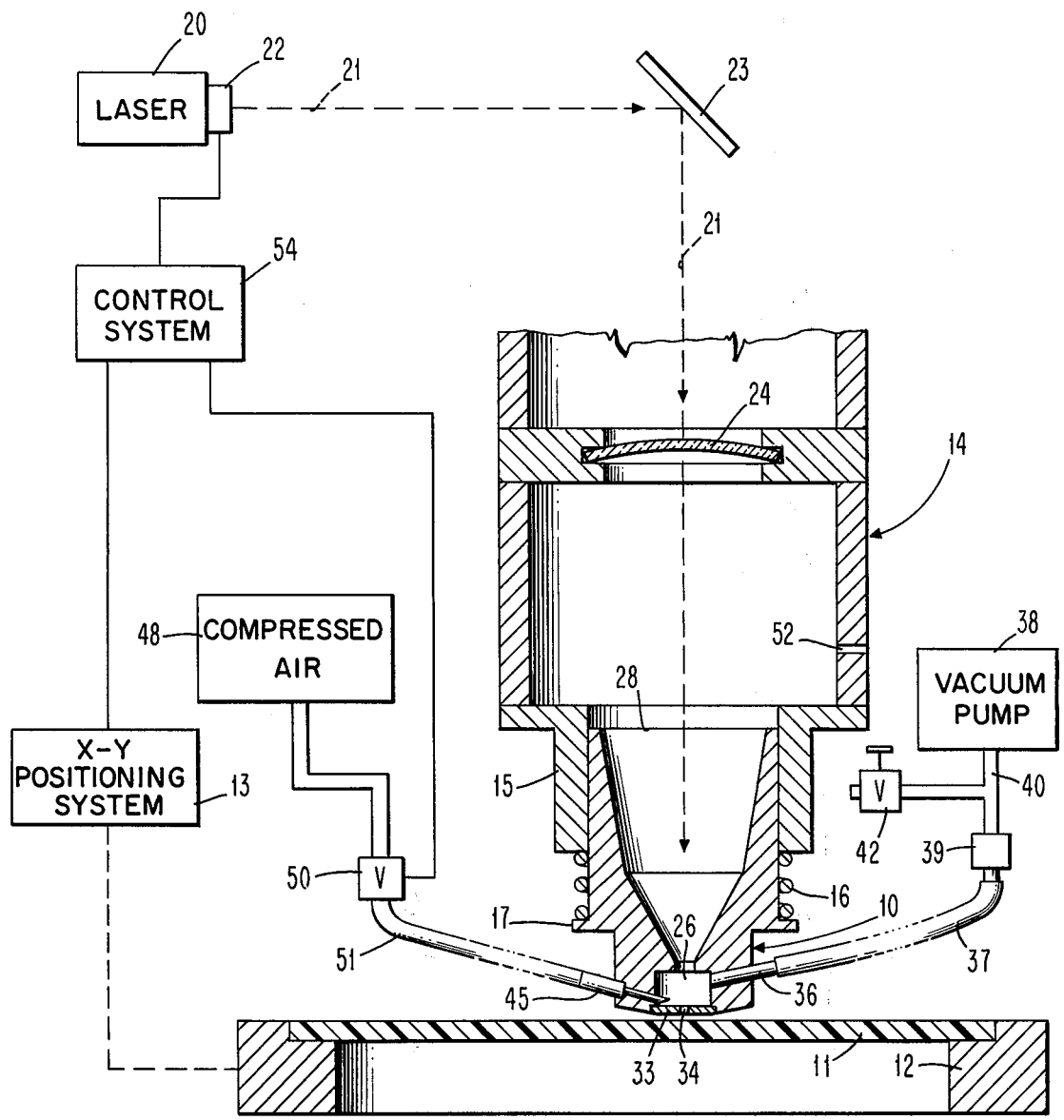
FIG. 1 shows a representative embodiment of laser drilling apparatus constructed in accordance with the present invention, portions of the apparatus being shown in a cross-sectional manner.

Referring to FIG. 1, the laser drilling apparatus there shown includes a cylindrical vertically extending metal nozzle 10 having its lower end adapted to engage a workpiece 11. The workpiece 11 is mounted on a movable worktable 12 which can be accurately positioned relative to the nozzle 10 by a workpiece positioning mechanism which includes an X-Y positioning system 13. The workpiece 11 can be, for example, a piece of integrated circuit substrate material, a printed circuit card or board, a support plate or any other sheet or plate material in which it may be desired to drill one or more holes.

A further positioning mechanism is provided for fixing the X-Y or horizontal location of the nozzle 10 and for causing the nozzle 10 to engage the workpiece 11. This nozzle positioning mechanism includes a cylindrical nozzle positioning structure 14 supported at a fixed distance above the workpiece 11 by means of appropriate support structure not shown. The positioning structure 14 includes at its lower end a nozzle holder portion 15 having a cylindrical body for slideably receiving the cylindrical upper end of the nozzle 10. A coil spring 16 surrounds the upper portion of the nozzle 10 and coacts between the underside of the nozzle holder 15 and an annular shoulder 17 on the nozzle 10 for purposes of urging the nozzle 10 downward and against the workpiece 11.

The drilling apparatus also includes a radiant energy mechanism for producing radiant energy and directing it into the hollow interior of the positioning structure 14 and the nozzle 10. This radiant energy mechanism includes a laser source or generator 20 for generating a collimated beam of coherent light energy. Laser 20 is of the continuous wave type and may be, for example, a $CO_2$ laser which emits coherent light radiation in the far infrared region. The generated laser beam 21 is emitted from the laser 20 by way of a mechanical shutter 22 which can be selectively operated to open and close the beam emitting port. The laser beam 21 is deflected down into the hollow interior of the nozzle positioning structure 14 by means of a mirror 23. A focusing lens 24 is mounted within the nozzle positioning structure 14 for focusing the laser beam 21 onto the workpiece 11 by way of the hollow interior of the nozzle 10.

The nozzle 10 and the nozzle positioning structure 14 are shown in a cross-sectional manner in FIG. 1. Each of these items 10 and 14 is of a generally cylindrical exterior shape and, as mentioned, each has a hollow interior for enabling the laser beam to travel downwardly therethrough and to the workpiece 11. Each of items 10 and 14 is made of metal material. If desired, the nozzle holder portion 15 may be a separate piece which is fastened to the lower end of the main body of the nozzle positioning structure 14. To obtain highly accurate X-Y plane positioning of the nozzle 10, a clearance of only 0.0002 inches is provided between the exterior of the upper end of the nozzle 10 and the interior of the downwardly extending body of the nozzle holder 15.

Figure 2:
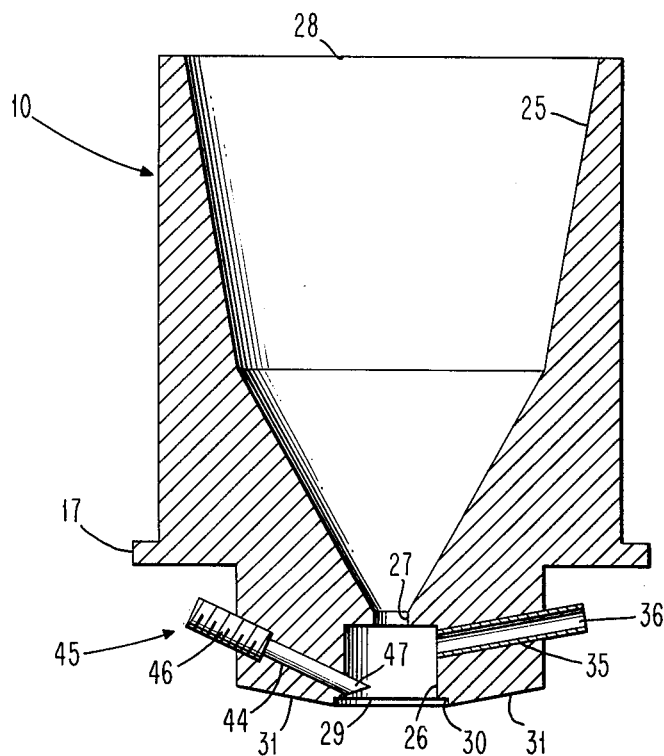
FIG. 2 is an enlarged cross-sectional view of the nozzle element of FIG. 1.

With reference to the enlarged cross-sectional view of FIG. 2, the nozzle 10 has disposed along the vertical center axis thereof a funnel-shaped upper chamber 25, a cylindrical lower chamber 26 and an interconnecting passageway 27. The upper chamber 25 is open at the top to form a circular port 28 at the top of the nozzle 10. The lower chamber 26 is open at the bottom to form a circular port 29 at the lower end of the nozzle 10. An annular recessed shoulder 30 is formed in the nozzle 10 around the perimeter of the lower port 29. The bottom surface 31 of the nozzle 10 surrounding the recessed shoulder 30 is cut at an angle relative to a horizontal plane so as to progressively recede from the workpiece surface as the distance from the vertical center axis of the nozzle 10 increases.

For purposes of explanation, the lower nozzle chamber 26 will be hereinafter referred to as the "vacuum" chamber. Also, the interconnecting passageway 27 which enters the top of the vacuum chamber 26 will sometimes be referred to as the radiant energy passageway for purposes of distinguishing it from other passageways to be mentioned hereinafter.

The nozzle 10 is provided with a thin end member or wall structure for closing the vacuum chamber port 29 and separating the vacuum chamber 26 from the workpiece 11. In the present embodiment, this end member or wall structure takes the form of a removable metal aperture plate or disk 33 (shown in FIG. 4) which is sized to fit into the recess for the shoulder 30 with a precise fit and close the vacuum chamber port 29. This aperture disk 33 is not shown in either FIG. 2 or FIG. 3, but is shown in its in-place position in the nozzle 10 in FIG. 1, this being its position and location during the performance of a drilling operation. A small hole or aperture 34 is located in the center of the disk 33 for providing communication between the vacuum chamber 26 and the workpiece 11 during a drilling operation. The size of the aperture 34 controls or defines the size of the hole which will be formed in the workpiece 11 and hence, is dependent on the size of the hole it is desired to drill. The diameter of the aperture 34 may be, for example, as small as 0.001 inches or as large as may be practical, depending on the desired size for the hole to be drilled.

In order to insure highly accurate positioning of the aperture 34 in the horizontal (X-Y) plane, the overall diameter of the disk 33 should be to within 0.0002 inches of the diameter of the shoulder 30 recess which receives the disk 33. The thickness of the disk 33 is slightly greater than the depth of the recess for the shoulder 30. This insures that it will be the disk 33 that is making contact with the workpiece 11 and not some part of the underside of the main body of the nozzle 10. The disk 33 may have a thickness of, for example, 0.005 inches and the recess for the shoulder 30 may have a depth of, for example, 0.004 inches. The metal material of which the disk 33 is made should have a relatively high melting point in order to be able to withstand the high temperatures generated in the vicinity of the aperture 34. A suitable material for this purpose is tungsten.

Figure 3:
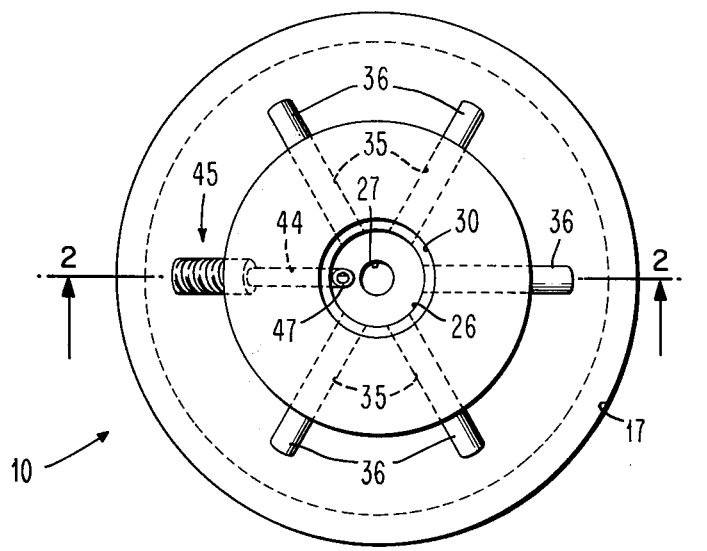
FIG. 3 is a bottom view of the nozzle structure shown in FIG. 2 (FIG. 2 being taken along section line 2—2 of FIG. 3)
Figure 4:
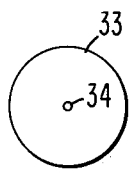
FIG. 4 is a plan view of the removable aperture disk which is mounted at the lower end of the nozzle during drilling operations.

As indicated in FIGS. 2 and 3, the nozzle 10 also includes a plurality of laterally extending exhaust passageways 35 communicating with and extending outwardly in different directions from the vacuum chamber 26 for enabling the air to be evacuated from the vacuum chamber 26. As indicated in FIG. 3, there are five such exhaust passageways 35 spaced at 60° intervals around the vacuum chamber 26. A separate exhaust tube 36 is press fit into each of these exhaust passageways 35. These exhaust tubes 36 extend outwardly a short distance from the body of the nozzle 10. As indicated in FIG. 1, each of these exhaust tubes 36 is connected by way of a flexible hose 37 to a vacuum producing mechanism represented by a vacuum pump 38. More accurately, the hoses 37 are connected to a common manifold chamber 39 which is, in turn, connected by way of a vacuum line 40 to the vacuum pump 38. The vacuum pump 38 operates to continuously evacuate the air from the vacuum chamber 26 during drilling operations.

An adjustment mechanism is associated with the vacuum pump 38 for adjusting the degree of vacuum in the vacuum chamber 26. In the present embodiment, this adjustment mechanism is represented by a bypass valve 42, one side of which is coupled to the vacuum line 40 and the other side of which is open to the atmosphere. Adjusting the degree of opening of the bypass valve 42 adjusts the degree of vacuum in the vacuum chamber 26. This, in turn, adjusts the bearing pressure of the nozzle 10 on the workpiece 11.

The nozzle 10 also includes an air supply passageway 44 located in the lower portion of the nozzle 10 and communicating with the vacuum chamber 26 for enabling a periodic blast of compressed air to be directed at the interior side of the aperture 34 in the aperture plate 33 for loosening any drilling debris that may have accumulated or built up in or about the aperture 34. An air supply tube 45 is located in the air supply passageway 44. This tube 45 has an enlarged and threaded head portion 46 which extends outwardly from the body of the nozzle 10 and a smaller diameter spout portion 47 which extends through the body portion of the nozzle 10 and part way into the vacuum chamber 26. This spout portion 47 is aimed at or pointed toward the in-place location of the aperture 34 in the removable disk 33. The outer portion of the air supply passageway 44 is internally threaded to receive the threaded head 46 of the air supply tube 45.

As indicated in FIG. 1, a source of compressed air 48 is coupled to the air supply tube 45 by way of a valve mechanism 50 and a flexible hose 51. Valve 50 is of the electrically controlled type such that it can be quickly opened and closed by supplying or not supplying an electrical actuating current thereto. In other words, valve mechanism 50 is of a spring loaded normally closed type which can be quickly opened by supplying an electrical actuating current thereto or quickly closed by discontinuing such electrical actuating current. When the valve 50 is open, compressed air is emitted from the interior end of the spout portion 47 of the air supply tube 45.

As seen in FIG. 1, there is located in the sidewall of the nozzle positioning structure 14 at a point intermediate the focusing lens 24 and the upper port 28 of the nozzle 10 an air inlet 52 for enabling a downward flow of air within the nozzle 10 and toward the vacuum chamber 26. This downward flow of air, together with the restriction provided by the reduced diameter of the radiant energy passageway 27, serves to prevent vapors and other debris resulting from the interaction of the laser beam with the workpiece material from reaching the focusing lens 24 and contaminating its lower surface.

The X-Y positioning system 13, the laser shutter mechanism 22 and the compressed air valve 50 are controlled by a control system 54. This control system 54 may be purely mechanical or electromechanical in nature. Preferably, however, the control system 54 includes a programmed digital controller for providing a greater degree of automation to the manufacturing process, particularly where the workpiece 11 is to have a goodly number of holes drilled at various different locations therein.

Operation of the Preferred Embodiment

Considering now the operation of the apparatus described above, it is assumed for sake of example that holes are to be drilled in the workpiece 11 at many different locations thereon. It is also assumed that the aperture disk 33 has not yet been put into place at the lower end of the nozzle 10. Initially, the vacuum pump 38 is turned on, the compressed air valve 50 is closed to prevent emission of compressed air, the laser 20 is turned on and the laser shutter 22 is closed to prevent emission of the laser beam. A temporary support plate is at this time positioned on the worktable 12 in place of the workpiece 11 and serves to prevent the nozzle 10 from falling out of the nozzle holder 15. In this regard, the coil spring 16 wants to push the nozzle 10 in the downwardly direction and, except for the temporary support plate, there is no mechanical element or elements for preventing the nozzle 10 from falling out of the nozzle holder 15.

With the vacuum pump 38 running, the machine operator raises the nozzle 10 by hand and slides the aperture disk 33 into place over the port 29 at the lower end of the vacuum chamber 26. As the disk 33 reaches approximately the correct position, the vacuum starts to build up at a rapid rate inside the vacuum chamber 26. This causes the disk 33 to more or less snap into place in the recess for the shoulder 30. With the presence of a substantial vacuum in the vacuum chamber 26, the machine operator need no longer keep his hand on the nozzle 10. The nozzle 10 will remain in a raised position by itself. With a high degree of vacuum in the vacuum chamber 26, the atmospheric pressure on the horizontal outer surfaces of the nozzle 10 forces the nozzle 10 to move in an upwardly direction until the weight of the nozzle 10 and the downward force exerted by the coil spring 16 counterbalance such atmospheric pressure. Thus, the vacuum holds the nozzle 10 in a raised position.

The temporary support plate is then removed and the workpiece 11 is positioned on and, if need be, secured to the worktable 12. The X-Y positioning system 13 is operated to position the workpiece 11 so that the desired location for the first hole is located directly below the aperture 34. After this, the vacuum pump bypass valve 42 is adjusted to reduce somewhat the degree of vacuum in the vacuum chamber 26 to allow the nozzle 10 to move downwardly and against the workpiece 11. Preferably, the bypass valve 42 is adjusted to a setting such that the bearing pressure of the nozzle 10 on the workpiece 11 is relatively light and substantially less than would be produced by the full weight of the nozzle 10. This enables subsequent movement of the workpiece 11 without having to raise the nozzle 10 and with only a minimum of friction or drag between the aperture disk 33 and the workpiece 11.

With the nozzle 10 in the proper position, the laser shutter 22 is opened and the laser beam 21 is deflected by the mirror 23 and passes down through the interior of the nozzle positioning structure 14, the nozzle upper chamber 25, the radiant energy passageway 27, the vacuum chamber 26 and the aperture 34 and onto the workpiece 11. The focusing lens 24 serves to focus the laser beam into a very small diameter ray having an intense concentration of energy therein. This intense concentration of energy strikes the workpiece 11 and vaporizes the material therein to drill the desired hole. The diameter of this ray at the point of the aperture 34 is slightly larger than the diameter of the aperture 34. Thus, the size of the aperture 34 actually determines the size of the hole drilled. This enables very acccurate control of the hole size.

As the laser beam strikes the workpiece 11, the material therein vaporizes in a very rapid manner, much like in a sudden puff or smoke or miniature explosion. The resulting vapor and other debris is instantaneously sucked into the vacuum chamber 26 and then exhausted therefrom by way of the exhaust tubes 36, hoses 37 and vacuum pump 38. In a manner of speaking, the vacuum causes the vaporized workpiece material to explode into the vacuum chamber 26, from whence it is immediately removed by the vacuum pump 38. Among other things, this prevents drilling debris from being trapped under the aperture disk 33 and later clogging the aperture 34 when the workpiece 11 is subsequently repositioned for the next hole. In order to prevent overheating of the aperture disk 33, the laser shutter 22 is closed very quickly once the hole is formed in the workpiece material 11. During the brief interval the laser beam is turned on, the aperture disk 33 serves the further purpose of shielding the workpiece material immediately surrounding the hole to prevent overheating and deterioration of such material.

After drilling of the first hole is completed, the worktable 12 is horizontally repositioned by the X-Y positioning system 13 to bring the next desired hole location in line with the aperture 34. The laser shutter 22 is then momentarily opened to form this next hole and then reclosed. These repositioning and drilling steps are thereafter repeated for each of the remaining desired hole locations in the workpiece 11. Thereafter, the nozzle 10 is raised (adjustment of bypass valve 42) and the completed workpiece 11 removed and replaced by a new workpiece. The foregoing steps are then repeated for the new workpiece.

The coil spring 16 helps provide a self-adjusting feature in that it enables the nozzle to move upwardly or downwardly in the vertical direction in case of any unevenness or raised or lowered spots or curvature in the workpiece 11. This enables the desired contact to be maintained with the workpiece 11 at the different hole locations without requiring any intervention on the part of the machine operator.

The vacuum in the vacuum chamber 26 causes a small amount of air to be sucked in through the inlet 52 in the side of the positioning structure 14 and to flow down through the nozzle upper chamber 25 and the radiant energy passageway 27 and into the vacuum chamber 26. This down flow of air, together with the restriction provided by the radiant energy passageway 27, prevents drilling vapors and debris from reaching and contaminating the focusing lens 24.

The compressed air source 48, the valve 50 and the air supply tube 45 are used during the drilling operations to periodically release a blast of compressed air aimed at the interior side of the aperture 34 in the disk 33. This is done for purposes of removing any drilling debris or crud that may have built up or accumulated in or about the aperture 34. The compressed air is released in a blast by momentarily opening and then reclosing the compressed air valve 50. During a typical drilling sequence, a few holes are drilled, then an air blast is emitted, a few more holes are drilled, then another air blast is emitted and so forth. Good results have been obtained where the number of holes drilled between successive air blasts is in the range of one to ten. The frequency will depend somewhat on the size of the aperture 34.

During typical drilling operations and with the removable aperture disk 33 in place, the degree of vacuum built up or, more accurately, the magnitude of air pressure remaining in the vacuum chamber 26, is on the order of approximately two inches of mercury.

After some 5,000 to 25,000 holes have been drilled, it is desirable to remove the aperture disk 33 and to clean the aperture 34 therein. With the present apparatus, this can be accomplished very quickly and easily. All that need be done is to release the vacuum in the vacuum chamber 26 by either turning off the vacuum pump 38 or opening up the bypass valve 42 and by operating the compressed air valve 50 to direct a stream of compresses air against the inner side of the disk 33. When these things are done, the disk 33 more or less pops out into the hand of the machine operator. The disk 33 may then be placed in an ultrasonic bath for purposes of cleaning same. The compressed air valve 50 is, of course, reclosed after the disk 33 is removed. After the aperture disk 33 has been cleaned, it can be readily reinstalled in the nozzle 10 by turning on the vacuum pump 38 and adjusting the valve 42 so as to commence the evacuation of the vacuum chamber 26. The aperture disk 33 is then slid under the nozzle 10 and, as it approaches the proper position, it pops back into place. Preferably, one or more spare aperture disks are kept on hand so that a clean one can be immediately installed and used while the dirty one is being cleaned. After some 100,000 to 200,000 holes have been drilled by any given aperture disk, it should be discarded and not reused.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for drilling holes in workpieces by means of radiant energy and comprising:
   a nozzle having a passageway extending through the interior thereof for enabling passage of radiant energy through the nozzle and onto a workpiece;
   a metal aperture plate having an aperture therein for defining the size of the hole to be formed in the workpiece by the radiant energy;
   a recess formed in the workpieces end of the nozzle and surrounding the radiant energy passageway for slideably receiving the aperture plate and aligning the aperture with the radiant energy axis of the nozzle, the depth of the recess being less than the thickness of the aperture plate;
   an exhaust passageway located in the nozzle and communicating with the radiant energy passageway near the workpiece end thereof for enabling the air to be continuously evacuated from the workpiece end of the nozzle interior, such evacuation process serving as the sole retentive force for holding the aperture plate in place in the recess and to remove the drilling debris from the workpiece via the aperture;
   and a positioning mechanism coacting with the nozzle for urging the exposed outer surface of the aperture plate against the workpiece;
   whereby the aperture plate in addition to defining the size of the hole to be formed in the workpiece also serves to protect the workpiece material immediately surrounding the hole;
   and whereby discontinuation of the evacuation process enables quick removal of the aperture plate for cleaning or replacement purposes.

2. Apparatus in accordance with claim 1 and further including a vacuum producing mechanism coupled to the exhaust passageway for continuously evacuating the air from the workpiece end of the nozzle interior.

3. Apparatus in accordance with claim 1 wherein the positioning mechanism includes:
   nozzle positioning structure supported at a fixed distance from the workpiece and having at its lower end a nozzle holder portion for slideably receiving the upper end of the nozzle, this positioning structure having a hollow interior space for enabling radiant energy to pass therethrough and down into the nozzle;
   a spring coacting with the positioning structure and the nozzle for urging the nozzle downward to cause the exposed outer surface of the aperture plate to bear against the workpiece;
   a vacuum producing mechanism coupled to the exhaust passageway for continuously evacuating the air from the workpiece end of the nozzle interior;
   and an adjustment mechanism associated with the vacuum producing mechanism for adjusting the degree of vacuum within the interior of the workpiece end of the nozzle for adjusting the bearing pressure of the aperture plate on the workpiece, this adjustment mechanism being set to enable movement of the workpiece without having to raise the nozzle and without excessive friction between the aperture plate and the workpiece, thereby to enable holes to be drilled at a plurality of different locations on the workpiece in a minimum amount of time.

4. Apparatus in accordance with claim 1 and including a second positioning mechanism for changing the workpiece location at which the aperture plate engages the workpiece for enabling holes to be drilled at a plurality of different locations on the workpiece.

5. Apparatus in accordance with claim 1 and further including:
an air supply element located in a nozzle for directing a stream of air at the interior side of the aperture;
a source of compressed air coupled to the air supply element;
a valve mechanism for controlling the flow of compressed air;
and a control mechanism for periodically momentarily opening the valve mechanism for enabling a periodic blast of compressed air to be directed at the interior side of the aperture for loosening any drilling debris that may have accumulated about the aperture.

6. Apparatus in accordance with claim 1 wherein:
the nozzle and the center axis of the radiant energy passageway therein are vertically disposed and there is disposed along such axis an upper chamber, a lower chamber and a reduced diameter interconnecting passageway, the upper chamber being open at the top to form a port at the top of the nozzle and the lower chamber being open at the bottom to form a port within the recess at the bottom of the nozzle;
and the exhaust passageway communicates with the lower chamber for enabling the air to be evacuated from the lower chamber;
and wherein the positioning mechanism includes:
nozzle positioning structure supported at a fixed distance from the workpiece and having at its lower end a nozzle holder portion for slideably receiving the upper end of the nozzle, this positioning structure having a hollow interior space for enabling radiant energy to pass therethrough and down into the nozzle;
a spring coating with the positioning structure and the nozzle for urging the nozzle downward to cause the exposed outer surface of the aperture plate to bear against the workpiece;
a vacuum producing mechanism coupled to the exhaust passageway for continuously evacuating the air from the lower nozzle chamber;
and an adjustment mechanism associated with the vacuum producing mechanism for adjusting the degree of vacuum within the lower nozzle chamber for adjusting the bearing pressure of the aperture plate on the workpiece, this adjustment mechanism being set to enable movement of the workpiece without having to raise the nozzle and without creating excessive friction between the aperture plate and the workpiece;
and wherein the apparatus further includes:
a second positioning mechanism for changing the workpiece location at which the aperture plate engages the workpiece for enabling holes to be drilled at a plurality of different locations on the workpiece.

* * * * *